(12) United States Patent
Park

(10) Patent No.: US 11,571,966 B1
(45) Date of Patent: Feb. 7, 2023

(54) UNIVERSAL DRIVING DEVICE

(71) Applicants: Hyundai Motor Company, Seoul (KR); Kia Corporation, Seoul (KR)

(72) Inventor: Jong Sool Park, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/891,045

(22) Filed: Aug. 18, 2022

(30) Foreign Application Priority Data

Mar. 29, 2022 (KR) .................. 10-2022-0038691

(51) Int. Cl.
*F16H 1/28* (2006.01)
*B60K 17/04* (2006.01)

(52) U.S. Cl.
CPC ......... *B60K 17/046* (2013.01); *F16H 1/2836* (2013.01)

(58) Field of Classification Search
CPC ............................ B60K 17/046; F16H 1/2836
See application file for complete search history.

(56) References Cited

U.S. PATENT DOCUMENTS

| | | | | |
|---|---|---|---|---|
| 3,315,547 A | * | 4/1967 | Fritsch | ............... F16H 1/2836 475/346 |
| 3,990,328 A | * | 11/1976 | Galbraith | ........... F16H 37/0853 475/185 |
| 6,206,800 B1 | * | 3/2001 | Kay | ..................... F16H 57/082 475/346 |
| 2012/0015771 A1 | * | 1/2012 | Haeusler | ................ F16H 1/006 475/183 |

FOREIGN PATENT DOCUMENTS

| | | | | |
|---|---|---|---|---|
| DE | 102008001791 A1 | * | 12/2009 | .......... B60K 17/046 |
| DE | 102020106536 A1 | * | 9/2021 | |
| KR | 10-2014-0062538 | | 5/2014 | |

* cited by examiner

*Primary Examiner* — Justin Holmes
(74) *Attorney, Agent, or Firm* — Morgan, Lewis & Bockius LLP

(57) ABSTRACT

A universal driving device includes a sun gear rotatably provided, a ring gear, wherein a rotation axis of the ring gear is moved relative to a rotation axis of the sun gear in a plane of rotation parallel to a plane of rotation of the sun gear, at least one gear train configured to allow relative motion between the rotation axes of the sun gear and the ring gear and to form a continuous power transmission state between the sun gear and the ring gear, and at least one balance gear engaged with the ring gear.

20 Claims, 13 Drawing Sheets

FIG. 10

| MULTIPLE | ANGLE |
|---|---|
| 1 | 3.16 |
| 2 | 6.32 |
| 3 | 9.47 |
| 4 | 12.63 |
| 5 | 15.79 |
| 6 | 18.95 |
| 7 | 22.11 |
| 8 | 25.26 |
| 9 | 28.42 |
| 10 | 31.58 |
| 11 | 34.74 |
| 12 | 37.89 |
| 13 | 41.05 |
| 14 | 44.21 |
| 15 | 47.37 |
| 16 | 50.53 |

⋮

| MULTIPLE | ANGLE |
|---|---|
| 62 | 195.79 |
| 63 | 198.95 |
| 64 | 202.11 |
| 65 | 205.26 |
| 66 | 208.42 |
| 67 | 211.58 |
| 68 | 214.74 |
| 69 | 217.89 |
| 70 | 221.05 |
| 71 | 224.21 |
| 72 | 227.37 |
| 73 | 230.53 |

⋮

UNIVERSAL DRIVING DEVICE

CROSS-REFERENCE TO RELATED APPLICATION

The present application claims priority to Korean Patent Application No. 10-2022-0038691, filed on Mar. 29, 2022, the entire contents of which is incorporated herein for all purposes by this reference.

BACKGROUND OF THE PRESENT DISCLOSURE

Field of the Present Disclosure

The present disclosure relates to a driving device which receives power input from a rotational power source, such as a motor, and outputs changed torque.

Description of Related Art

The driving device of a vehicle transmits power from a rotational power source, such as an engine or a motor, to wheels to drive the vehicle.

An in-wheel motor-type driving system in which a motor is directly provided in a driving wheel has recently been proposed, but the in-wheel motor-type driving system is not being widely used now due to a durability problem of the motor, a ride comfort problem caused by increase in the unsprung mass of the vehicle, etc.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a driving device which receives power input from a rotational power source, such as a motor, and outputs changed torque, and more particularly, when the driving device is applied to a vehicle, to provide a universal driving device which may decelerate the speed of the input power and increase the torque of the input power to secure excellent uphill driving and accelerated driving performance of the vehicle, may install a power source, such as a motor, separately from a wheel to which severe impact and vibration are applied to improve durability of the power source, may secure excellent ride comfort due to reduction in the upsprung mass of the vehicle, and may achieve continuous power transmission from the power source in response to vertical movement of the wheel without using a constant velocity joint to reduce a space between the power source and the wheel and ultimately to secure excellent space utilization between a left wheel and a right wheel.

In accordance with various aspects of the present disclosure, the above and other objects may be accomplished by the provision of a universal driving device including a sun gear rotatably provided, a ring gear provided such that a rotation axis thereof is moved relative to a rotation axis of the sun gear in a plane of rotation parallel to a plane of rotation of the sun gear, at least one gear train configured to allow relative motion between the rotation axes of the sun gear and the ring gear and to form a continuous power transmission state between the sun gear and the ring gear, and at least one balance gear engaged with the ring gear.

Each of the at least one gear train may be provided through a plurality of links, connection angles between which are changed depending on the relative motion between the rotation axes of the sun gear and the ring gear.

The plurality of links may include a first link, a first end of which is connected to the rotation axis of the sun gear and a second link, a first end of which is connected to a second end of the first link, and a joint pinion having a same number of gear teeth as the sun gear may be provided at a connection portion between the first link and the second link.

A final pinion engaged with the ring gear may be provided at the second link, and the final pinion may have a same number of gear teeth as the sun gear.

The final pinion may be configured to transmit power from the sun gear to the ring gear by a series of gears through the joint pinion.

The at least one gear train may include a plurality of gear trains provided in a circumferential direction of the sun gear.

Rotation axes of respective final pinions of the plurality of gear trains and a rotation axis of the at least one balance gear may be supported by the carrier.

The plurality of links may include a first link, a first end of which is connected to the rotation axis of the sun gear and a second link, a first end of which is connected to a second end of the first link, and rotation axes of a series of gears configured to transmit power from the sun gear to the ring gear may be provided on the first link and the second link.

Among the series of gears configured to form each of the at least one gear train, gears located at even-numbered positions from the sun gear may have a same number of gear teeth as the sun gear.

A gear located at a second position from the sun gear may be a joint pinion provided concentrically with rotation axes of the first link and the second link, and a gear located at a fourth position from the sun gear may be a final pinion engaged with the ring gear.

A first intermediate pinion configured so that a rotation axis thereof is provided on the first link may be engaged with the sun gear and the joint pinion, and a second intermediate pinion configured so that a rotation axis thereof is provided on the second link may be engaged with the joint pinion and the final pinion.

The at least one gear train may include a plurality of gear trains provided in a circumferential direction of the sun gear, and the respective final pinions of the gear trains may be supported by the carrier such that relative positions of the final pinions to one another remain constant and rotation of the final pinions about rotation axes thereof is allowed.

Each of at least one gear train may be formed by consecutively engaging at least four gears, and rotation axes of the at least four gears may be rotatably supported by the plurality of links consecutively connected.

The at least one gear train may be configured so that relative phases of the sun gear and the ring gear remain constant in response to the relative motion between the rotation axes of the sun gear and the ring gear.

Among the gears, a final pinion engaged with the ring gear may be supported by the carrier so that revolution of the final pinion around the sun gear is restrained and rotation of the final pinion about a rotation axis thereof is allowed, and the at least one balance gear may be rotatably supported by the carrier.

The at least one balance gear may be provided at a position configured not to interfere with the at least one gear train and links, during the relative motion between the rotation axes of the sun gear and the ring gear.

The at least one balance gear may be provided at a position including an angle configured to be an integer multiple of a Least Mesh Angle (LMA) of a double-pinion planetary gear set.

The at least one balance gear may include a plurality of balance gears provided to be symmetric about the rotation axis of the ring gear.

The at least one balance gear may include a plurality of balance gears provided to be symmetric with respect to a straight line passing through the rotation axis of the ring gear in a radial direction of the rotation axis.

The at least one balance gear may be rotatably supported by the carrier, among gears forming each of at least one gear train, a rotation axis of a final pinion engaged with the ring gear may be rotatably supported by the carrier, the carrier may be supported by a vehicle body to be raisable and lowerable, a wheel may be connected to the ring gear, and a rotation axis of a motor mounted in the vehicle body may be connected to the sun gear.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 10 is an exemplary LMA table;

Figure 1:
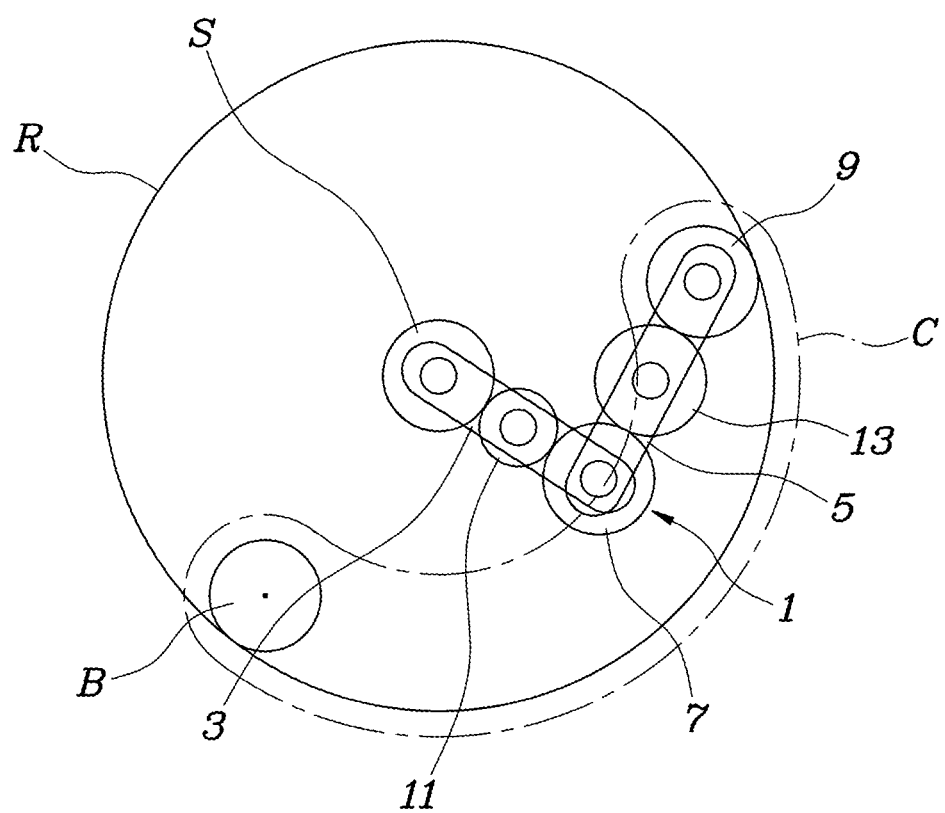
FIG. 1 is a view exemplarily illustrating various exemplary embodiments of a universal driving device according to an exemplary embodiment of the present disclosure.
Figure 2:
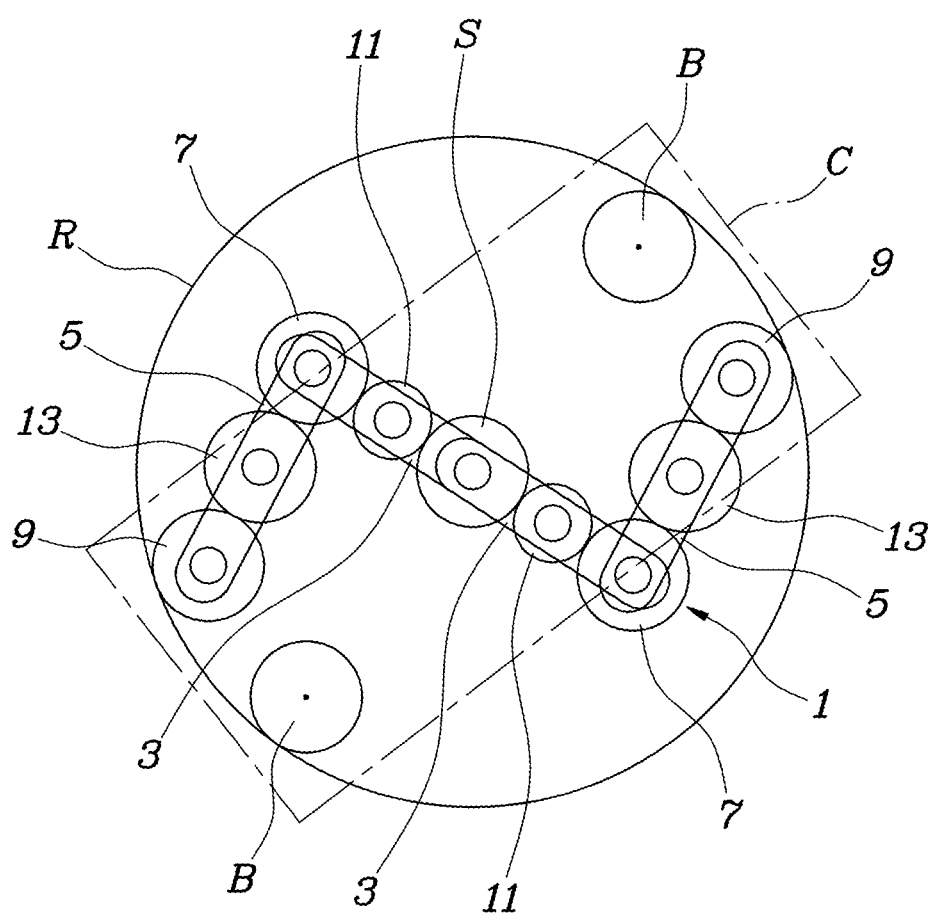
FIG. 2 is a view exemplarily illustrating various exemplary embodiments of the universal driving device according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to a same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions in embodiments of the present disclosure set forth in the description which follows will be exemplarily provided to describe the embodiments of the present disclosure. However, the present disclosure may be embodied in many alternative forms, and should not be construed as being limited to the embodiments set forth herein.

The exemplary embodiments of the present disclosure may be variously modified and changed, and thus specific embodiments of the present disclosure will be illustrated in the drawings and described in detail in the following description of the exemplary embodiments of the present disclosure. However, it will be understood that the exemplary embodiments of the present disclosure are provided only to completely include the present disclosure and cover modifications, equivalents or alternatives which come within the scope and technical range of the present disclosure.

In the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the present disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

The terminology used herein is for describing particular embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless defined otherwise, all terms including technical and scientific terms used in the following description have the same meanings as those of terms generally understood by those skilled in the art. Terms defined in generally used dictionaries will be interpreted as having meanings coinciding with contextual meanings in the related technology, and are not to be interpreted as having ideal or excessively formal meanings unless defined clearly in the description.

Hereinafter, reference will now be made in detail to the exemplary embodiments of the present disclosure, examples of which are illustrated in the accompanying drawings. Wherever possible, the same reference numbers will be used throughout the drawings to refer to the same or like parts.

All embodiments of a universal driving device according to an exemplary embodiment of the present disclosure shown in FIG. 1, FIG. 2, FIG. 3, FIG. 4, FIG. 5, FIG. 6, FIG. 7 and FIG. 8 include a sun gear S rotatably provided, a ring gear R provided such that the rotation axis thereof is moved relative to the rotation axis of the sun gear S in a plane of rotation parallel to the plane of rotation of the sun gear S, at least one gear train 1 configured to allow relative motion between the rotation axes of the sun gear S and the ring gear R and to form a continuous power transmission state between the sun gear S and the ring gear R, and at least one balance gear B engaged with the ring gear R.

That is, in the universal driving device according to the present disclosure, the sun gear S and the ring gear R are provided such that the rotation axes thereof remain parallel to each other and relative displacements thereof are allowed, and the gear train 1 is provided to continuously maintain the power transmission state between the sun gear S and the ring gear R in spite of the relative displacements of the sun gear S and the ring gear R.

Furthermore, the balance gear B is engaged with the ring gear R in the state in which the balance gear B supports the ring gear R.

The gear train 1 is provided through a plurality of links, connection angles between which are changed depending on the relative motion between the rotation axes of the sun gear S and the ring gear R.

The plurality of links may include a first link 3 connected to the rotation axis of the sun gear S and a second link 5 connected to the first link 3, rotation axes of a series of gears are provided on the first link 3 and the second link 5 to transmit power from the sun gear S to the ring gear R, and a joint pinion having the same number of gear teeth as the sun gear S is provided at a connection portion between the first link 3 and the second link 5.

A final pinion 9 engaged with the ring gear R is provided at the second link 5, and the final pinion 9 has the same number of gear teeth as the sun gear S.

Therefore, the final pinion 9 may transmit power from the sun gear S to the ring gear R by a series of gears through the joint pinion 7, and the sun gear S, the joint pinion 7 and the final pinion 9 have the same number of gear teeth.

As described above, among the series of gears forming the gear train 1, gears located at even-numbered positions from the sun gear S, i.e., the joint pinion 7 and the final pinion 9, should have the same number of gear teeth as the sun gear S, so that the ring gear R may be moved relative to the sun gear S without changing relative phases of the sun gear S and the ring gear R, and a continuous and stable power transmission state between the sun gear S and the ring gear R may be maintained.

A first intermediate pinion 11, the rotation axis of which is provided on the first link 3, is engaged with the sun gear S and the joint pinion 7, and a second intermediate pinion 13, the rotation axis of which is provided on the second link 5, is engaged with the joint pinion 7 and the final pinion 9.

Therefore, power from the sun gear S may sequentially pass the first intermediate pinion 11, the joint pinion 7, the second intermediate pinion 13 and the final pinion 9, and may be transmitted to the ring gear R.

A plurality of gear trains 1 may be provided in the exemplary embodiments of the universal driving device U shown in FIG. 2, FIG. 3, FIG. 4, FIG. 5, FIG. 6, and FIG. 7, and when a plurality of gear trains 1 is provided as described above, the respective final pinions 9 of the gear trains 1 are rotatably supported by a carrier C so that the relative positions of the final pinions 9 to one another may remain constant and the final pinions 9 may be allowed only to rotate about rotation axes thereof, and the balance gears B may also be rotatably supported by the carrier C.

Of course, even in the configuration shown in FIG. 1, the final pinion 9 engaged with the ring gear R is supported by the carrier C so that revolution of the final pinion 9 around the sun gear S is restrained and only rotation of the final pinion 9 about the rotation axis thereof is allowed, and the balance gear B is also rotatably supported by the carrier C.

The balance gear B supports the ring gear R in the state in which the balance gear B is engaged with the ring gear R, and thus, when vibration or impact from a load, such as a wheel for vehicles, coupled to the ring gear R is input to the ring gear R and is transmitted to the carrier C, the transmission paths of such vibration or impact between the ring gear R and the carrier C may be increased and an impact load may be distributed, and separation of the central axes of the ring gear R and the carrier is prevented and the central axes of the ring gear R and the carrier are concentric with each other, and thus, the universal driving device according to present disclosure may have improved silence, stability and durability.

Figure 3:
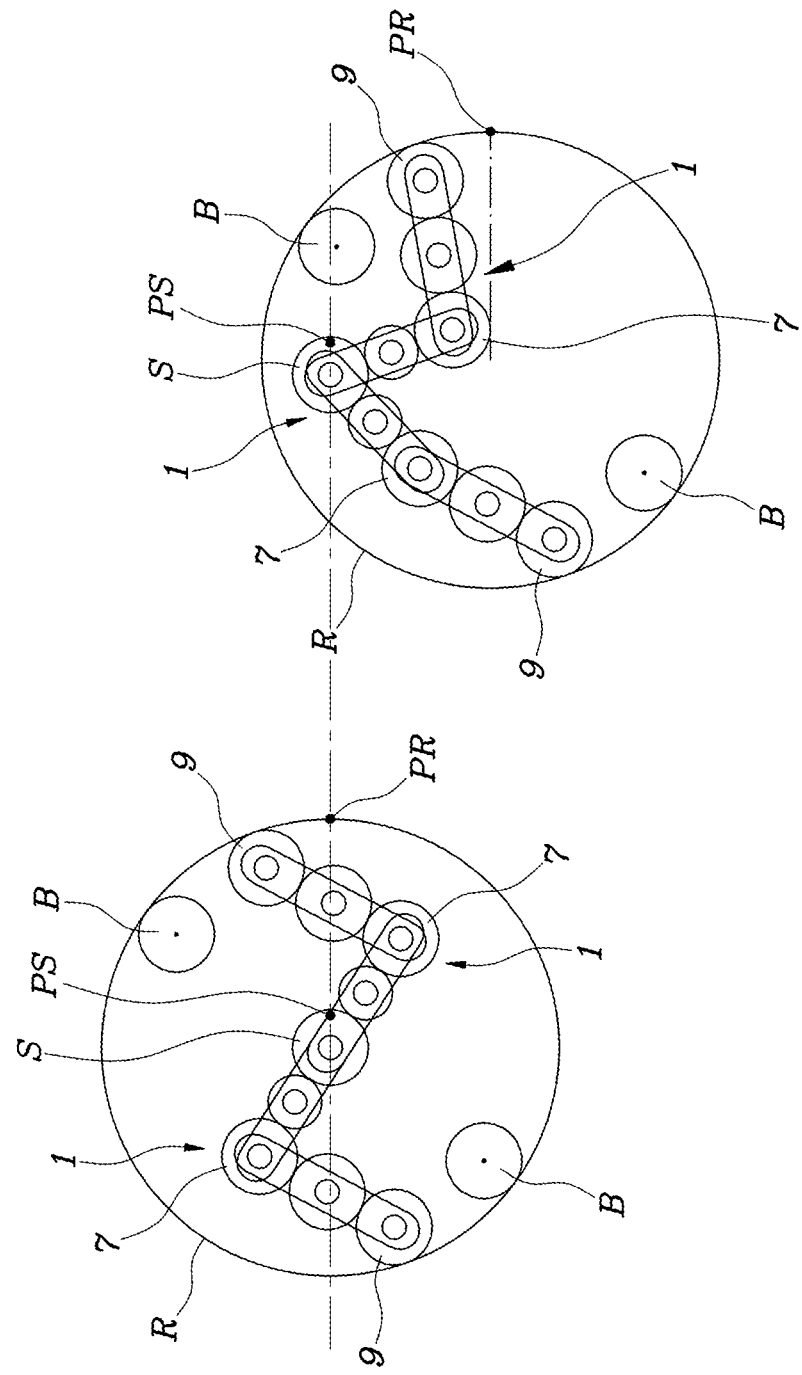
FIG. 3 is a view exemplarily illustrating comparison between the original state of the various exemplary embodiments and the state of the various exemplary embodiments in which a ring gear is lowered.
Figure 4:
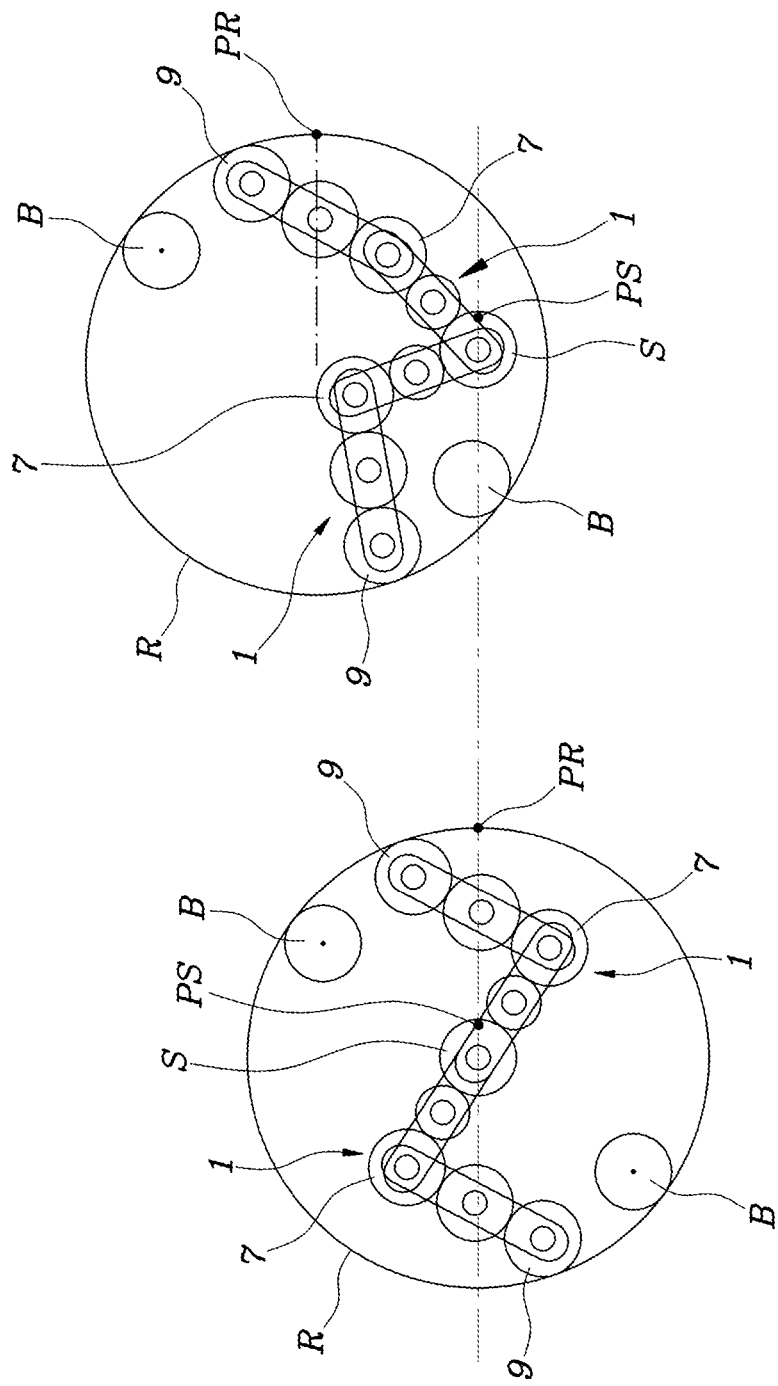
FIG. 4 is a view exemplarily illustrating comparison between the original state of the various exemplary embodiments and the state of the various exemplary embodiments in which the ring gear is raised.
Figure 5:
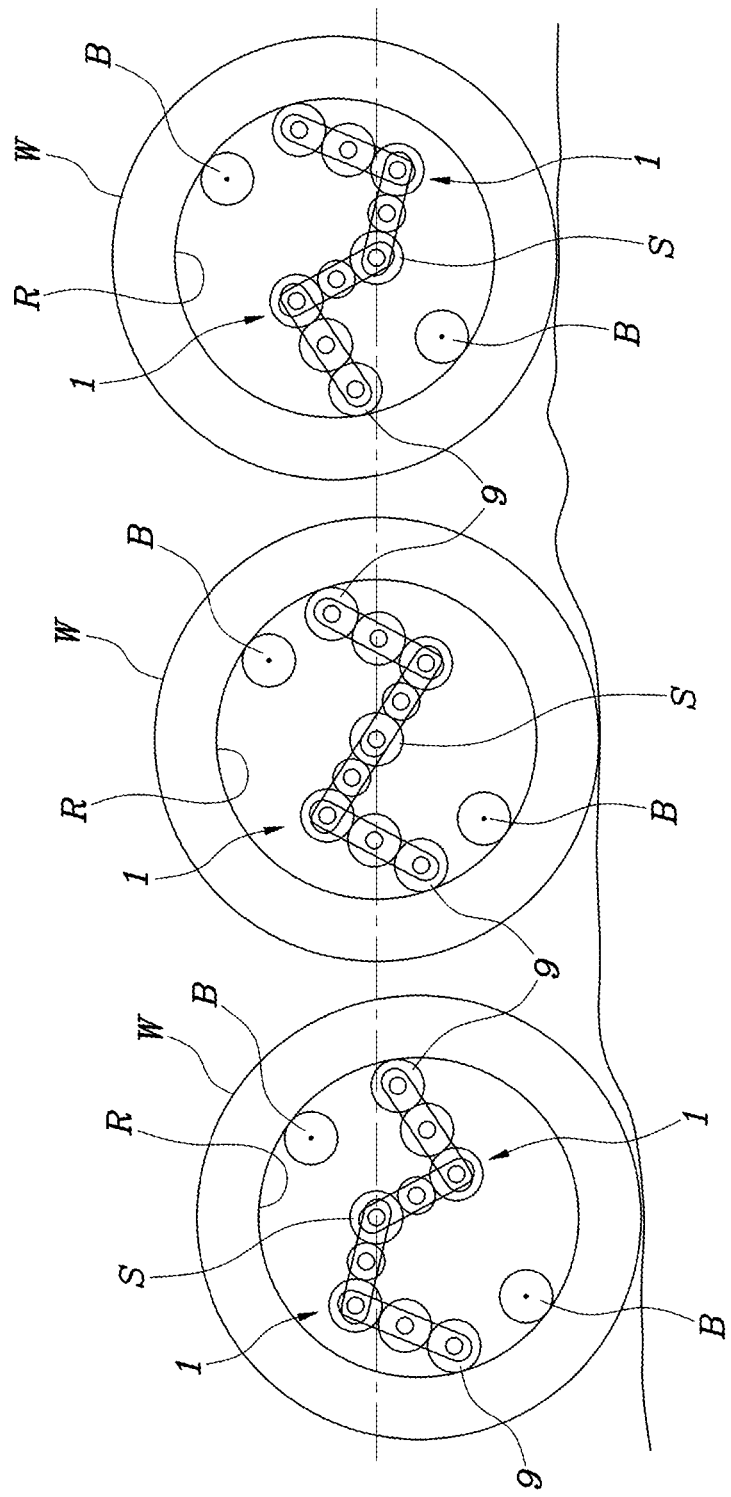
FIG. 5 is a view exemplarily illustrating raising and lowering of the ring gear and a wheel of a vehicle, to which the various exemplary embodiments shown in FIG. 2 is applied, with respect to a sun gear.

Referring to FIG. 3 and FIG. 4, in raising or lowering of the ring gear R relative to the sun gear S, the angle between the first link 3 and the second link 5 in each of the gear trains 1 is changed, but the first intermediate pinion 11 continuously maintains engagement with the sun gear S and the final pinion 9 continuously maintains engagement with the ring gear R, so that continuous power transmission between the sun gear S and the ring gear R may be achieved.

The gear trains 1 are configured so that the relative phases of the sun gear S and the ring gear R remain constant in response to the relative motion between the rotation axes of the sun gear S and the ring gear R.

Here, remaining of the relative phases of the sun gear S and the ring gear R in response to the relative motion between the rotation axes of the sun gear S and the ring gear S constant may indicate that phases of points PS and PR marked at 0 degree positions of the sun gear S and the ring gear R maintain the 0 degree positions thereof even when the ring gear R is raised or lowered relative to the sun gear S, as shown in FIG. 3 and FIG. 4.

That is, when the rotation axes of the sun gear S and the ring gear R translate relative to each other in the same plane, the sun gear S and the ring gear R are not rotated relative to each other by the translational motion of the rotation axes of the gun gear S and the ring gear R.

This means that additional rotation motion of the sun gear S does not occur, although the wheel W of a vehicle is moved up and down due to vertical irregularities of a road and thus the ring gear R connected to the wheel W is moved up and down, and means that the torque of the sun gear S may be easily and stably controlled through control of the torque of the motor connected to the sun gear S.

To allow the relative phases of the sun gear S and the ring gear R to remain constant when the ring gear R is raised or lowered relative to the sun gear S, among the series of gears forming each of the gear trains 1, gears located at even-numbered positions from the sun gear S, i.e., the joint pinion 7 and the final pinion 9, should have the same number of gear teeth as the sun gear S.

Figure 12:
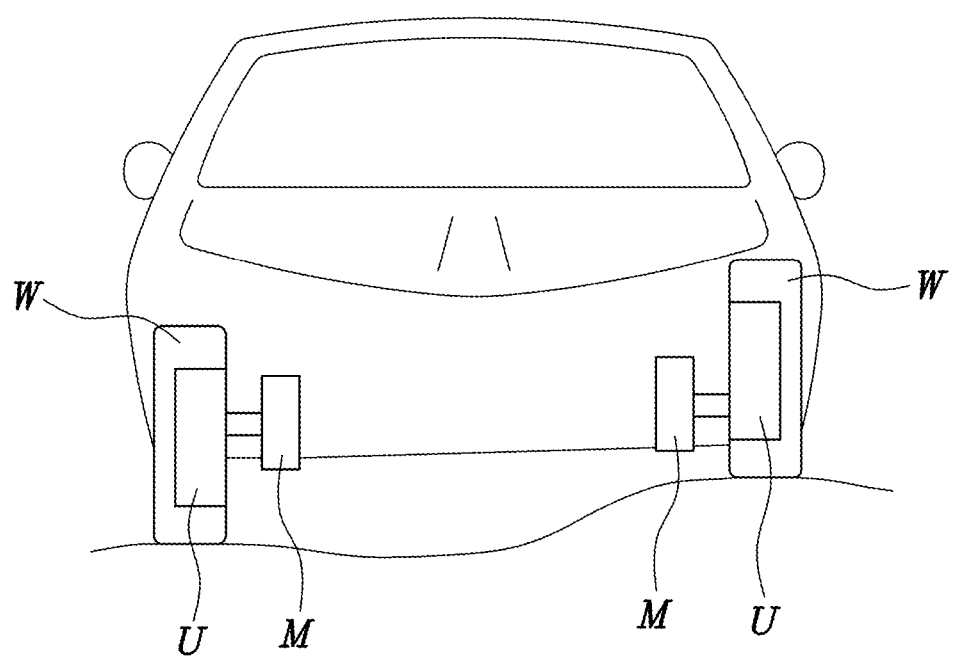
FIG. 12 is a view exemplarily illustrating an example of application of the universal driving device according to an exemplary embodiment of the present disclosure to a vehicle.
Figure 13:
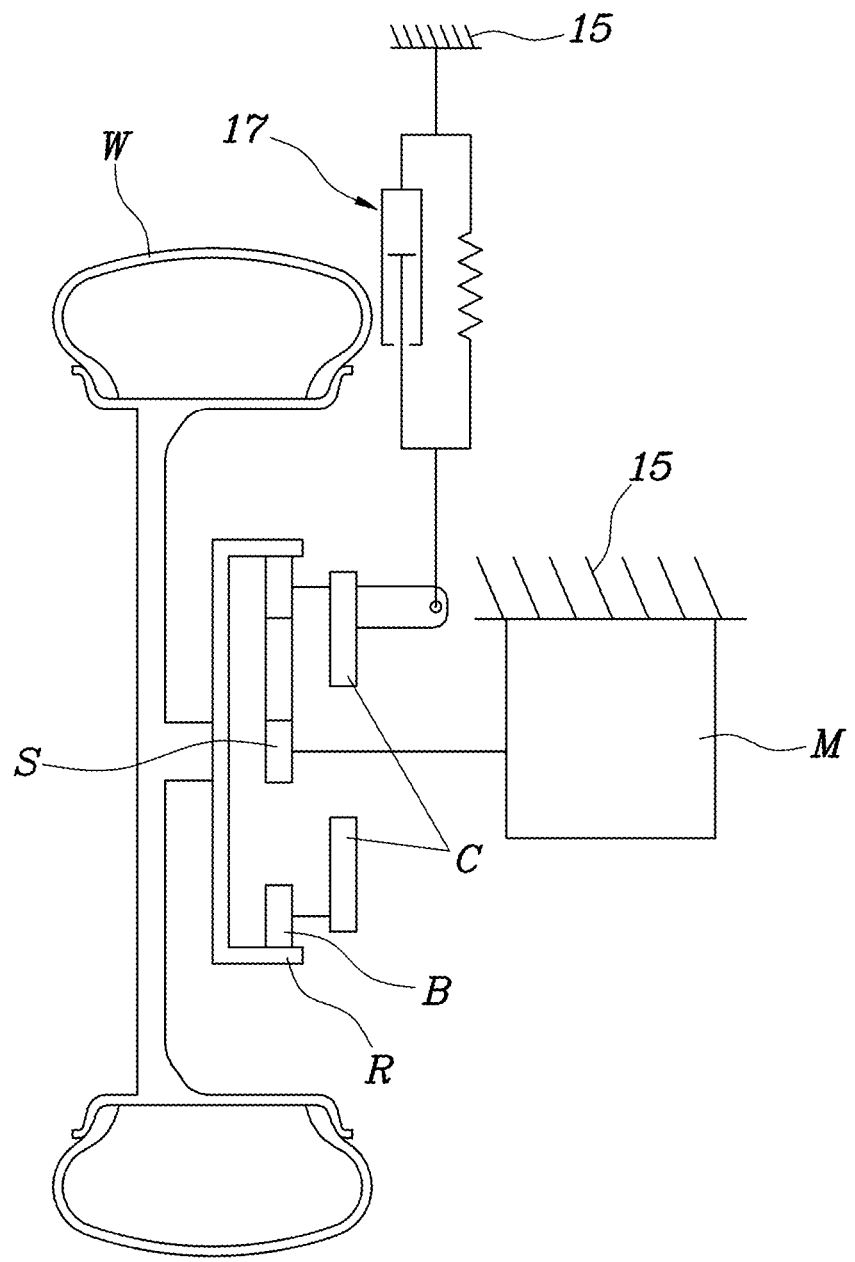
FIG. 13 is a view exemplarily illustrating a structure in which a wheel and a universal driving device of FIG. 12 are supported by a vehicle body.

These characteristics of the universal driving device according to an exemplary embodiment of the present disclosure may allow the relative phases of the sun gear S and the ring gear R to remain constant, when a vehicle is driven using power of a motor M and a wheel W and the ring gear R are raised or lowered relative to the sun gear S under the condition that the sun gear S is connected to the motor M fixed to a vehicle body, the wheel W is connected to the ring gear R, and the carrier C is supported by the vehicle body to be raisable or lowerable, as illustrated in FIG. 12, and FIG. 13, and may thus continuously and stably transmit power from the motor M to the wheel W sequentially via the sun gear S, the gear trains 1 and the ring gear R, while preventing the vehicle from surging or pitching.

The balance gear B is provided at a position which does not interfere with the gear train 1 and the links 3 and 5 in case of the relative motion between the ring gear R with respect to the sun gear S.

That is, the balance gear B is provided to be engaged at a position of the ring gear R, which does not interfere with the gear train 1 and the links 3 and 5 during the relative motion of the ring gear R with respect to the sun gear S, and thus supports the ring gear R with respect to the carrier C.

In a second exemplary embodiment shown in FIG. 2, FIG. 3, FIG. 4 and FIG. 5, two balance gears B are provided to be symmetric about the rotation axis of the ring gear R.

Figure 6:
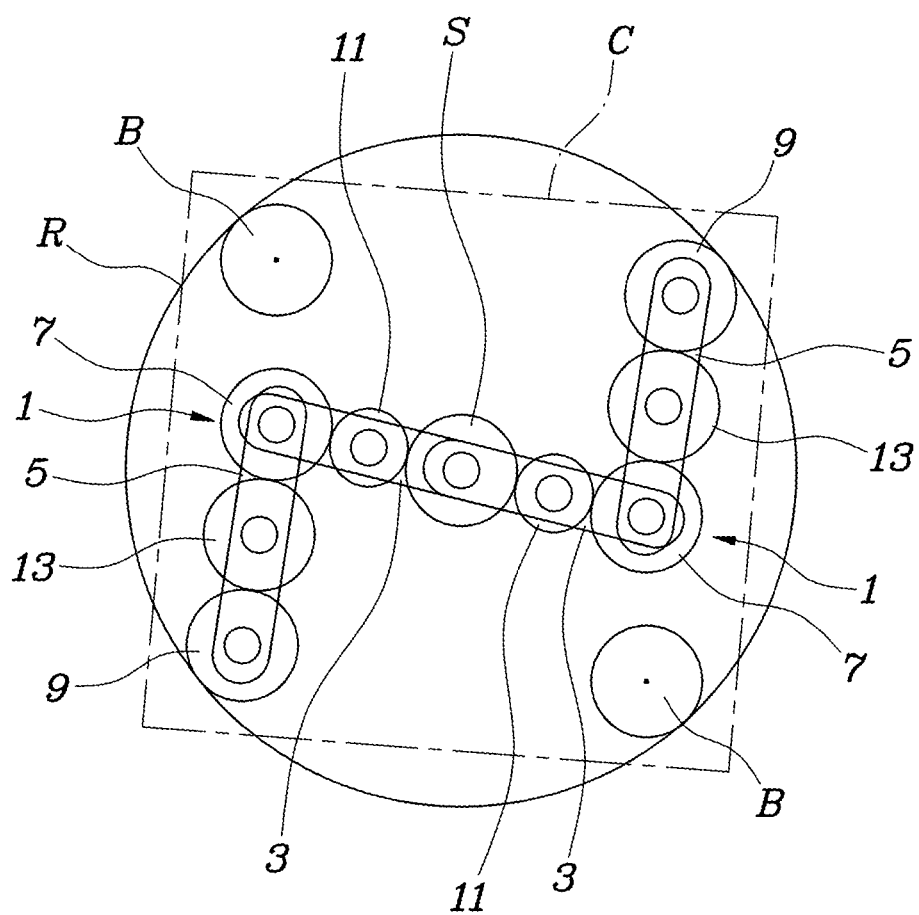
FIG. 6 is a view exemplarily illustrating various exemplary embodiments of the universal driving device according to the present disclosure.

FIG. 6 is a view exemplarily illustrating various exemplary embodiments of the universal driving device according to the present disclosure, and two balance gears B are also provided to be symmetric about the rotation axis of the ring gear R.

Figure 7:
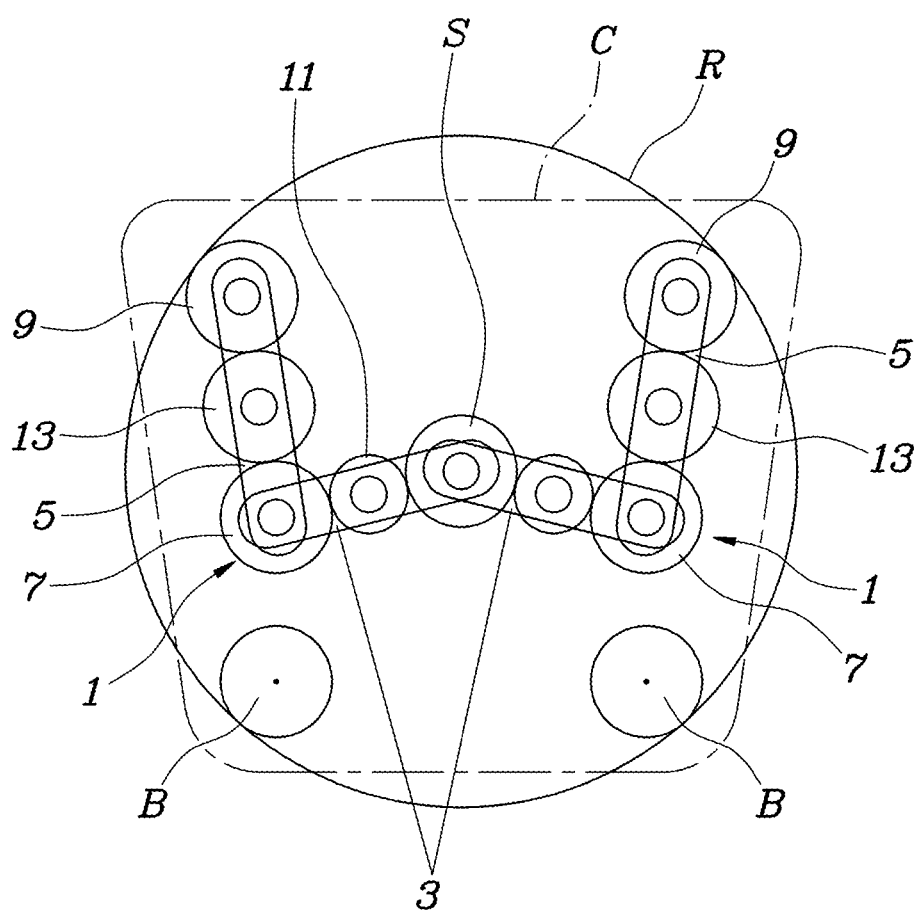
FIG. 7 is a view exemplarily illustrating various exemplary embodiments of the universal driving device according to the present disclosure.

Furthermore, FIG. 7 is a view exemplarily illustrating various exemplary embodiments of the universal driving device according to the present disclosure, and two balance gears B are provided to be symmetric with respect to a straight line passing through the rotation axis of the ring gear R.

That is, FIG. 7 shows an example in which the balance gears B are provided to be symmetric with respect to a line vertically passing through the rotation axis of the ring gear R.

Figure 8:
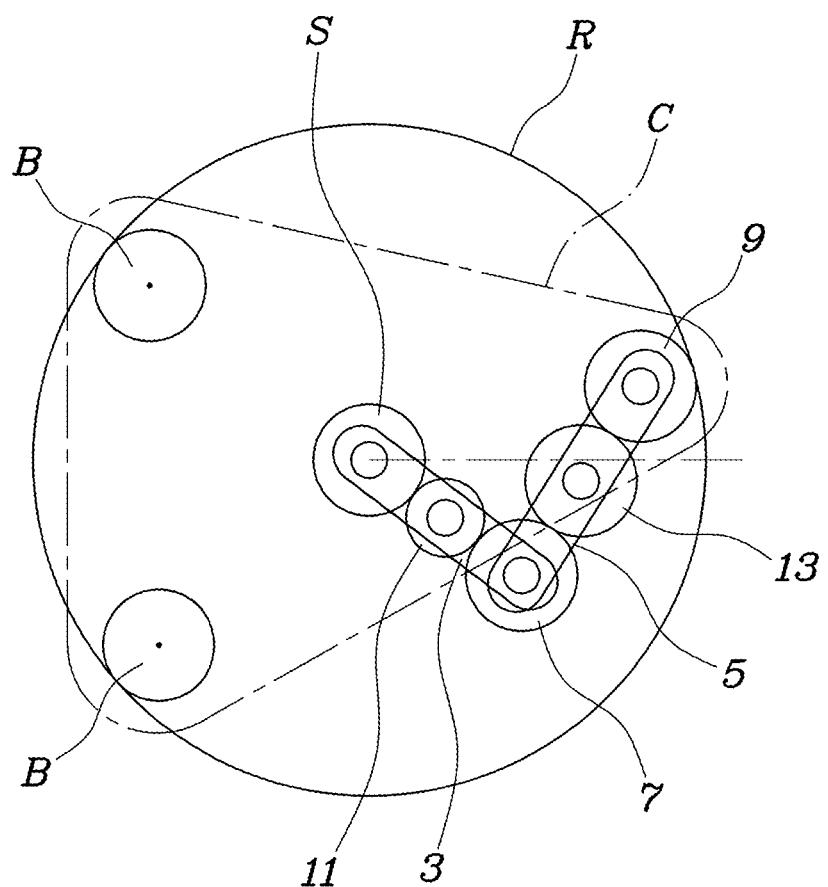
FIG. 8 is a view exemplarily illustrating various exemplary embodiments of the universal driving device according to the present disclosure.

Moreover, FIG. 8 is a view exemplarily illustrating various exemplary embodiments of the universal driving device according to the present disclosure, showing an example in which a plurality of gears B are provided at positions which do not interfere with the gear train 1 and the links 3 and 5 during the relative motion between the rotation axes of the sun gear S and the ring gear R with respect to each other.

The balance gear B may be provided at a position having an angle which is an integer multiple of the Least Mesh Angle (LMA) of a double-pinion planetary gear set. In the instant case, although the position of the balance gear B and the position of the final pinion 9 are interchanged, the balance gear B and the final pinion 9 are normally operated, and thus, universal driving devices having a larger number of complications of elements may be implemented. Therefore, the universal driving devices may cope with the optimized designs of various vehicles.

Figure 9:
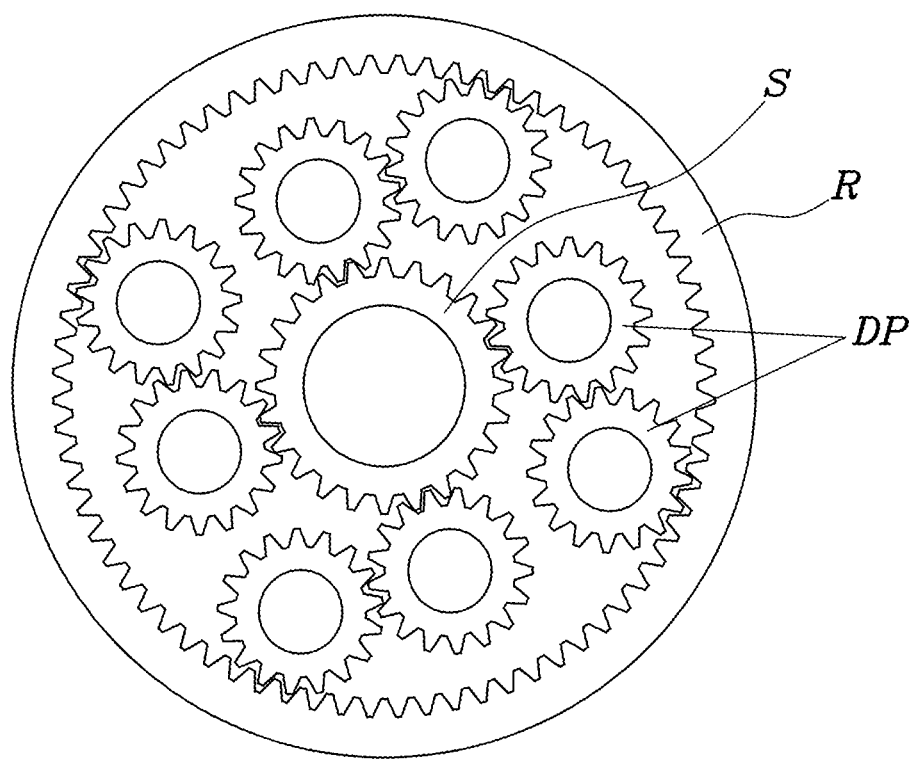
FIG. 9 is a view of a double-pinion planetary gear set for illustrating a Least Mesh Angle (LMA)

The universal driving device according to an exemplary embodiment of the present disclosure may determine the Least Mesh Angle (LMA) using the same Equation as an Equation to determine the LMA which is used in a double-pinion planetary gear set shown in FIG. 9.

For reference, the double-pinion planetary gear set shown in FIG. 9 includes a sun gear S, a ring gear R, and double-pinions DP engaged between the sun gear S and the ring gear R.

The LMA is determined by the following Equation.

$$LMA = 360°/(ZR-ZS)$$

Here, ZR indicates the number of gear teeth of the ring gear R, and ZS indicates the number of gear teeth of the sun gear S.

For example, when ZR=137 and ZS=23, $$LMA = 360°/(137-23) = 3.15789°, \text{ and}$$

the integer multiples of the LMA may set forth in the Table shown in FIG. 10.

Figure 11:
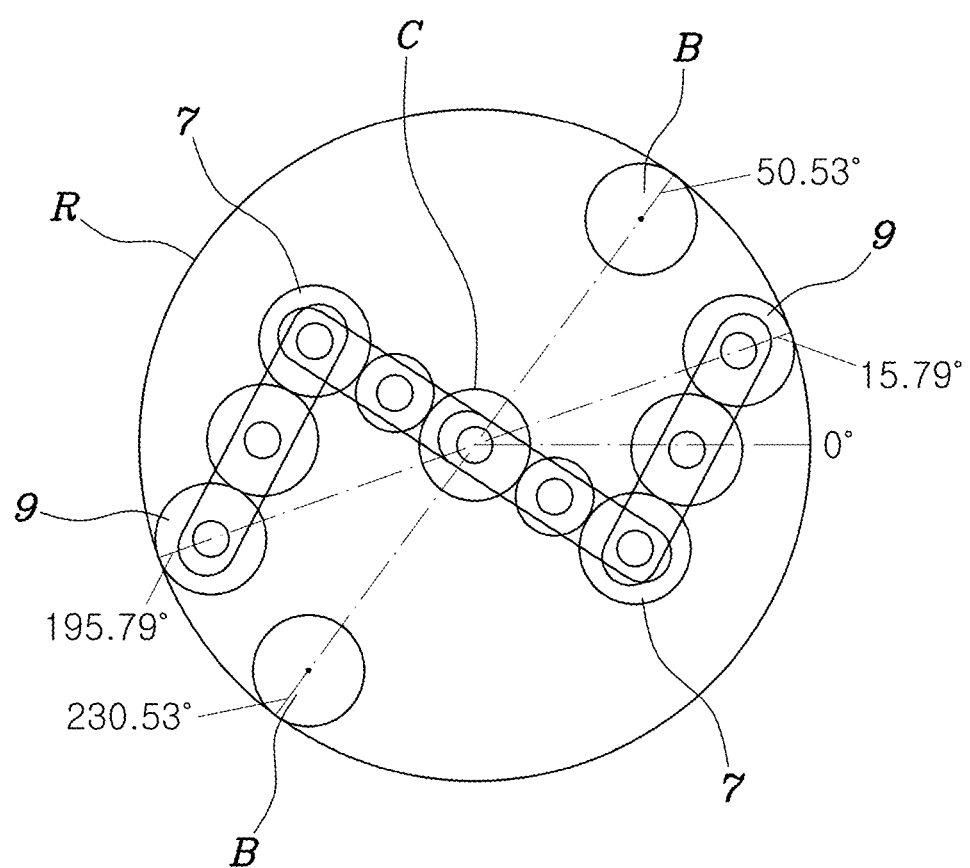
FIG. 11 is view exemplarily illustrating balance gears provided at positions set forth in the LMA table of FIG. 10.

FIG. 11 shows that the balance gears B are provided at a position including an angle of 50.53° which is 16 times the LMA, and at a position including an angle of 230.53° which is 73 times the LMA.

Furthermore, FIG. 11 shows that the final pinions 9 are provided at a position including an angle of 15.79° which is 5 times the LMA, and at a position including an angle of 195.79° which is 62 times the LMA, to be engaged with the ring gear R.

A power source may be connected to the sun gear S, and a load may be connected to the ring gear R, so that the speed of the input power may be decelerated and the torque of the input power be increased and then be transmitted to the load.

Otherwise, a power source may be connected to the ring gear R, and a load may be connected to the sun gear S, so that power of the power source may be increased and then be transmitted to the load.

Furthermore, by connecting the rotation axis of a motor M to the sun gear S and connecting a wheel W to the ring gear R, the universal driving device U according to an exemplary embodiment of the present disclosure may be used as a driving device of a vehicle, as illustrated in FIG. 12.

FIG. 13 illustrates a structure in which the wheel W and the universal driving device U shown in FIG. 12 are supported by a vehicle body in more detail, and the structure is configured so that the balance gear B is rotatably supported by the carrier C, the rotation axis of the final pinion 9 engaged with the ring gear R, among the gears forming the gear train 1, is rotatably supported by the carrier C, the carrier C is supported by a vehicle body 15 to be raisable and lowerable through a suspension portion 17, the wheel W is connected to the ring gear R, and the rotation axis of the motor M mounted in the vehicle body 15 is connected to the sun gear S.

In the instant case, the universal driving device according to an exemplary embodiment of the present disclosure may be configured so that the speed of the motor M input to the sun gear S may be decelerated and the torque of the motor M be increased and transmitted to the ring gear R, thus being configured for securing excellent uphill driving and accelerated driving performance of the vehicle.

Furthermore, the universal driving device according to an exemplary embodiment of the present disclosure may install the motor M outside the wheel W to which severe impact and vibration are applied, rather than inside the wheel W, being configured for improving durability of the motor M and securing excellent ride comfort due to reduction in the upsprung mass of the vehicle.

Moreover, the universal driving device according to an exemplary embodiment of the present disclosure may achieve constant power transmission while allowing the ring gear R, to which the wheel W is connected, to be raised or lowered relative to the sun gear S connected to the power source, and may thus achieve continuous power transmission from the power source in response to vertical movement of the wheel without using the conventional constant velocity joint, being configured for reducing a space between the power source and the wheel W, and ultimately securing excellent space utilization between a left wheel and a right wheel.

In addition the universal driving device according to an exemplary embodiment of the present disclosure may allow the carrier C to be connected to the ring gear R not only through the final pinions 9 of the gear trains 1 but also through the balance gears B to distribute an impact load transmitted between the ring gear R and the carrier C and to more securely support the state in which the central axis of the ring gear R is concentric with the central axis of the carrier C, being configured for securing stable operability and durability, and preventing occurrence of unnecessary noise due to operation of proper gears.

As is apparent from the above description, a universal driving device according to an exemplary embodiment of the present disclosure, which receives power input from a rotational power source, such as a motor, and outputs changed torque, may decelerate the speed of the input power and increase the torque of the input power to secure excellent uphill driving and accelerated driving performance of a vehicle, when the universal driving device is applied to a vehicle, may install the power source, such as the motor, separately from a wheel to which severe impact and vibration are applied to improve durability of the power source, may secure excellent ride comfort due to reduction in the upsprung mass of the vehicle, and may achieve continuous power transmission from the power source in response to vertical movement of the wheel without using a constant velocity joint to reduce a space between the power source and the wheel and ultimately to secure excellent space utilization between a left wheel and a right wheel.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A universal driving apparatus comprising:
   a sun gear rotatably provided;
   a ring gear, wherein a rotation axis of the ring gear is moved relative to a rotation axis of the sun gear in a plane of rotation parallel to a plane of rotation of the sun gear;
   at least one gear train configured to allow relative motion between the rotation axes of the sun gear and the ring gear and to form a continuous power transmission state between the sun gear and the ring gear; and
   at least one balance gear only engaged with the ring gear.

2. The universal driving apparatus of claim 1, wherein each of the at least one gear train is provided through a plurality of links, connection angles between which are changed depending on the relative motion between the rotation axes of the sun gear and the ring gear.

3. The universal driving apparatus of claim 2,
   wherein the plurality of links includes a first link, a first end of which is connected to the rotation axis of the sun gear and a second link, a first end of which is connected to a second end of the first link, and
   wherein a joint pinion of the at least one gear train and having a same number of gear teeth as the sun gear is provided at a connection portion between the second end of the first link and the first end of the second link.

4. The universal driving apparatus of claim 3,
   wherein a final pinion of the at least one gear train and engaged with the ring gear is provided at a second end of the second link, and
   wherein the final pinion has a same number of gear teeth as the sun gear.

5. The universal driving apparatus of claim 4, wherein the final pinion is configured to transmit power from the sun gear to the ring gear by a series of gears through the joint pinion.

6. The universal driving apparatus of claim 4, wherein the at least one gear train includes a plurality of gear trains provided in a circumferential direction of the sun gear.

7. The universal driving apparatus of claim 6, wherein rotation axes of respective final pinions of the plurality of gear trains and a rotation axis of the at least one balance gear are supported by a carrier.

8. The universal driving apparatus of claim 2,
   wherein the plurality of links includes a first link, a first end of which is connected to the rotation axis of the sun gear and a second link, a first end of which is connected to a second end of the first link, and
   wherein rotation axes of a series of gears configured to transmit power from the sun gear to the ring gear are provided on the first link and the second link.

9. The universal driving apparatus of claim 8, wherein, among the series of gears configured to form each of the at least one gear train, gears located at even-numbered positions from the sun gear have a same number of gear teeth as the sun gear.

10. The universal driving apparatus of claim 9,
wherein a gear located at a second position from the sun gear, among the gears located at even-numbered positions is a joint pinion provided concentrically with rotation axes of the first link and the second link, and
wherein a gear located at a fourth position from the sun gear among the gears located at even-numbered positions is a final pinion engaged with the ring gear.

11. The universal driving apparatus of claim 10,
wherein the series of gears further includes a first intermediate pinion and a second intermediate pinion,
wherein the first intermediate pinion, a rotation axis of which is provided on the first link, is engaged with the sun gear and the joint pinion, and
wherein the second intermediate pinion, a rotation axis of which is provided on the second link, is engaged with the joint pinion and the final pinion.

12. The universal driving apparatus of claim 10,
wherein the at least one gear train includes a plurality of gear trains provided in a circumferential direction of the sun gear, and
wherein respective final pinions of the gear trains are supported by a carrier so that relative positions of the final pinions to one another remain constant and rotation of the final pinions about rotation axes thereof is allowed.

13. The universal driving apparatus of claim 2,
wherein each of the at least one gear train is formed by consecutively engaging at least four gears, and
wherein rotation axes of the at least four gears are rotatably supported by the plurality of links consecutively connected.

14. The universal driving apparatus of claim 13, wherein the at least one gear train is configured so that relative phases of the sun gear and the ring gear remain constant in response to the relative motion between the rotation axes of the sun gear and the ring gear.

15. The universal driving apparatus of claim 13, wherein among the at least four gears, a final pinion engaged with the ring gear is supported by a carrier so that revolution of the final pinion around the sun gear is restrained and rotation of the final pinion about a rotation axis thereof is allowed; and
the at least one balance gear is rotatably supported by the carrier.

16. The universal driving apparatus of claim 1, wherein the at least one balance gear is provided at a position configured not to interfere with the at least one gear train and a plurality of links, during the relative motion between the rotation axes of the sun gear and the ring gear.

17. The universal driving apparatus of claim 16, wherein the at least one balance gear is provided at a position including an angle configured to be an integer multiple of a Least Mesh Angle (LMA) of a double-pinion planetary gear set.

18. The universal driving apparatus of claim 16, wherein the at least one balance gear includes a plurality of balance gears provided to be symmetric about the rotation axis of the ring gear.

19. The universal driving apparatus of claim 16, wherein the at least one balance gear includes a plurality of balance gears provided to be symmetric with respect to a straight line passing through the rotation axis of the ring gear in a radial direction of the rotation axis.

20. The universal driving apparatus of claim 16,
wherein the at least one balance gear is rotatably supported by a carrier,
wherein among gears forming each of at least one gear train, a rotation axis of a final pinion engaged with the ring gear is rotatably supported by the carrier,
wherein the carrier is supported by a vehicle body to be raisable and lowerable,
wherein a wheel is connected to the ring gear, and
wherein a rotation axis of a motor mounted in the vehicle body is connected to the sun gear.

* * * * *